April 3, 1962 W. B. BROADWELL 3,028,589
MOTION DIGITIZER
Filed April 6, 1959 2 Sheets-Sheet 1
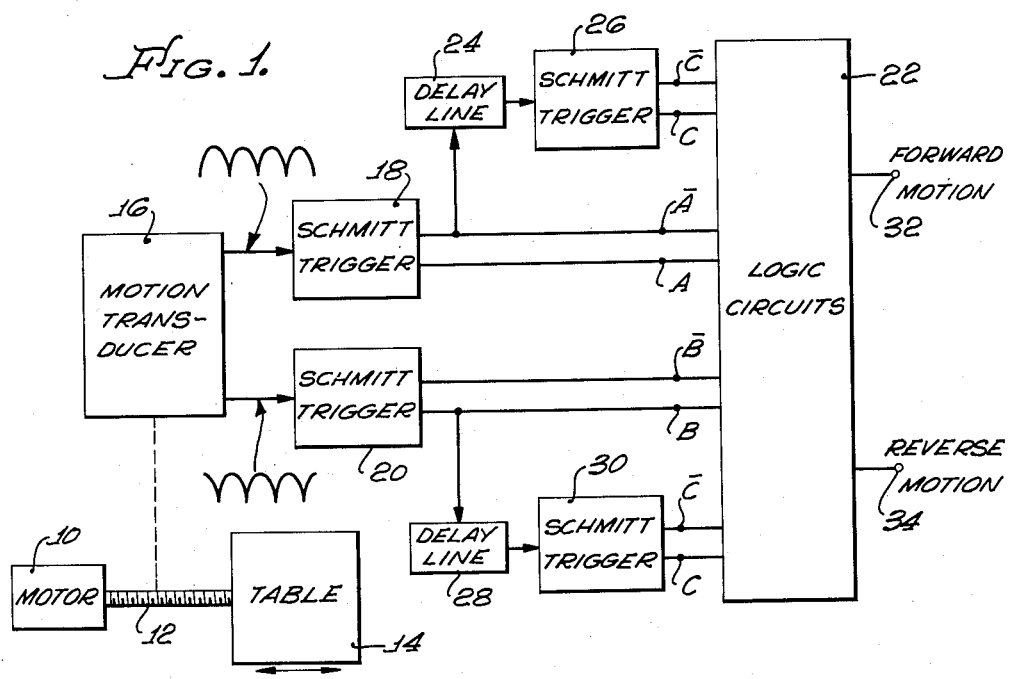
FIG. 1.
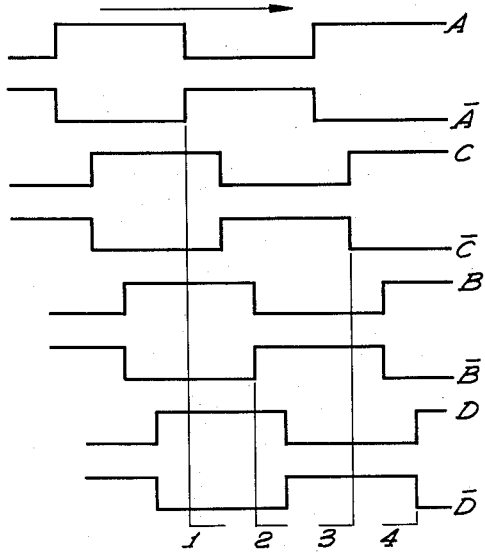
FIG. 2.
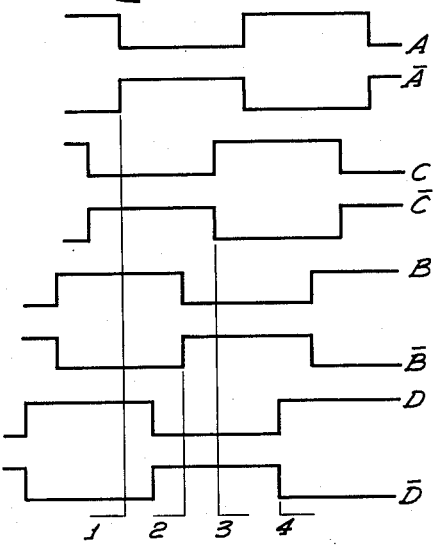
INVENTOR.
WALTER B. BROADWELL
BY
ATTORNEYS.

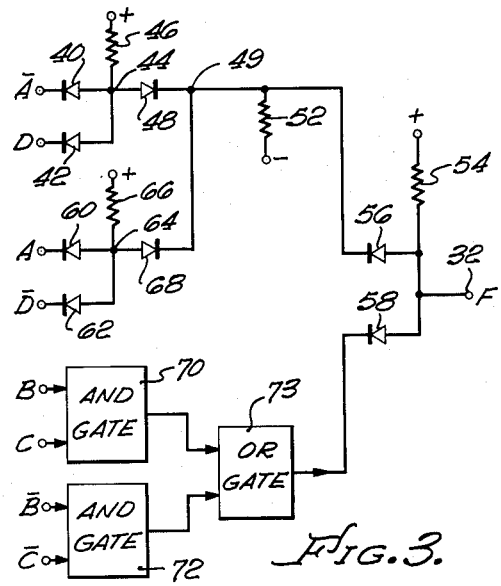
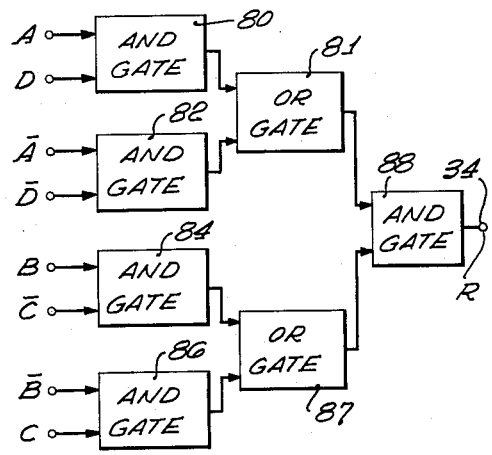
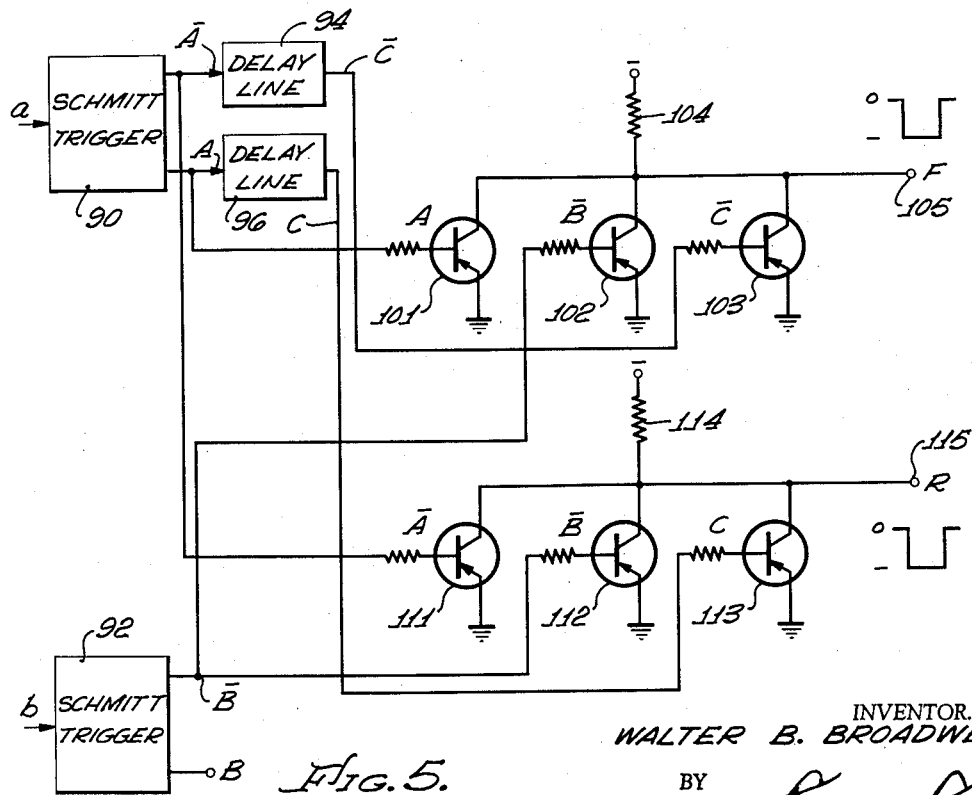

United States Patent Office 3,028,589
Patented Apr. 3, 1962

3,028,589
MOTION DIGITIZER
Walter B. Broadwell, Santa Monica, Calif., assignor to General Dynamics Corporation, Rochester, N.Y., a corporation of Delaware
Filed Apr. 6, 1959, Ser. No. 804,384
5 Claims. (Cl. 340—347)

This invention relates to electrical circuits for detecting the direction and extent of a body from signals produced by a motion transducer actuated by said body, and more particularly to improvements therein.

In the field of electronic automatic machine-tool control, using by way of illustration the system for controlling an automatic milling machine, control signals are applied to a motor which drives a lead screw which, in turn, drives the machine-tool table. There are different systems for deriving the signals employed for controlling the motor. One preferred arrangement is termed a digital servoloop control system. The motor is controlled in response to digital signals. A motion transducer is coupled to be actuated by the machine-tool table motion. From the output of the motion transducer, digital signals are derived which are compared in number with the digital signals issued to command motion. When the number is identical, it is known that the motion commanded by the input signals has been executed by the machine-tool table.

A loop control system of the type referred to is found described in detail in a patent by Jack Rosenberg et al., Ser. No. 544,478, now Patent No. 2,833,941, for Automation System. In connection with such a system, an error register is employed comprising a reversible counter. Command signals, consisting of pulses, each of which represents a desired increment of motion, are applied to the reversible counter. The count of the counter is sensed and converted into a signal which is applied to a motor which drives the machine-tool table. The motion transducer actuated by the machine-tool table motion provides an output which is converted into pulse signals. These pulse signals are applied to the reversible counter in a manner to reverse its count from that which arises by the application of the command pulse signals. The counter, when driven back to zero, indicates the motion commanded has been accomplished.

It becomes necessary, in such an operation, to detect from the output of the motion transducer not only the occurrence of a motion increment, but also the direction of such motion. Patent No. 2,817,775 to Jack Rosenberg et al. describes an arrangement for detecting the direction and extent of motion from motion transducer signals comprising two trains of half-wave signals which are out of phase relatively by approximately 90 space degrees. Another improved system for accomplishing this purpose is shown and described in a patent, No. 2,867,724, to Olson. The present invention is directed to an improved arrangement for accomplishing this purpose. The term used to characterize such a circuit is "motion digitizer."

It is an object of this invention to provide an improved motion digitizer.

Another object of this invention is to provide a novel and simple motion digitizer.

Yet another object of the invention is to provide an arrangement for showing both the direction of travel as well as the distance of travel from input information comprising two electrical waves which are relatively 90° out of phase in space.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of an embodiment of the invention;

FIGURE 2 is pulse wave shapes generated by the invention, which are shown to assist in an understanding thereof;

FIGURES 3 and 4 are circuit diagrams of logic circuits which are employed in the invention; and FIGURE 5 is a circuit diagram of another embodiment of the invention.

As previously indicated, the general type of transducer employed for detecting the motion of an object, such as a machine-tool table, provides two trains of signals in response to that motion, which signals are displaced in phase relative to one another. There are any number of well-known schemes for generating these signals. One system employs a light source, a photocell and diffraction gratings interposed therebetween which provide different patterns when the table moves from which the photocell generates output signals. The transducer may be attached either to the table or to the lead screw driving the table. The Farrand Corporation of New York city sells a transducer known as "Inductosyn," which is coupled to the lead screw by means of suitable gearing and consists of a synchro of extreme accuracy. A magnetic transducing arrangement may also be employed wherein, on two separate tracks, two trains of pulses may be recorded which are in phase quadrature with one another. Two transducer heads may be positioned over the respective tracks. A magnetically recorded track may either be actuated by, or attached to move with, the moving apparatus while the two heads are held stationary.

All of these arrangements produce, as their outputs, two trains of half-wave signals which are phase displaced relative to one another. The control circuit must not only detect whether or not motion has occurred from these two trains of signals, but also how many increments of motion and the direction of such motion. In FIGURE 1, a motor 10 drives a lead screw 12 which, in turn, moves a table 14. The table may move either forward or in reverse along one coordinate axis in response to the lead screw drive. Another motor and lead screw, not shown, are employed to move the table along another co-ordinate axis. This motor and lead screw arrangement is usually included in a machine tool, such as a milling machine or drill press. It is desired to detect for the purposes of automatic control by apparatus not shown, the direction of motion as well as the increments of motion occurring in such direction. In order to accomplish this, the motion transducer 16 is coupled to the lead screw 12. This motion transducer may be of one of the types mentioned. Each time the lead screw rotates in response to the drive by the motor, it actuates the motion transducer to provide as an output two trains of pulses of the general type indicated above the output leads. These are out of phase by approximately 90 space degrees. The outputs of the motion transducer are fed to the apparatus comprising the embodiment of the invention. As a result, output is provided at one output lead indicating motion in one direction, or on another output lead indicating motion in the opposite direction. The output comprises pulses and the numbers of these pulses may be employed to evidence the number of increments of motion which have occurred.

The apparatus comprising an embodiment of this invention, to which the motion transducer input is applied, includes a first and a second Schmitt trigger circuit, respectively 18, 20. The Schmitt trigger circuit is a well-known type of trigger circuit which is described in an article by O. H. Schmitt, which is entitled A Thermionic Trigger Circuit, and is found described in the "Journal of Scientific Instruments," vol. 15, pp. 24 through 26, January 1938. This trigger circuit has two states, one of which it assumes as long as there is an input applied thereto. It returns to the other state when its input is removed. The amplitude of the input signal required may be determined or controlled by selection of the bias and circuit component values of the trigger circuit. The trigger circuit has two output terminals. In the presence of an input exceeding the predetermined amplitude, one of the outputs will provide a negative output potential, while the other provides a positive output potential. In the absence of the input having the predetermined amplitude, the negative and positive output potentials applied to the output terminals are interchanged.

Thus, for Schmitt trigger 18, the potential at output terminal A is negative-going in the presence of an input while the potential at output terminal $\bar{A}$ is negative-going in the absence of such an input. Similarly, for Schmitt trigger 20, in the presence of an input exceeding the predetermined amplitude, the potential at terminal B is negative-going, at which time the potential at terminal $\bar{B}$ is positive-going. In the absence of an input, terminal $\bar{B}$ has a negative-going potential and terminal B has a positive-going potential. Actually, the Schmitt trigger circuits serve the function of squaring the waveforms which are applied to their inputs. The output of Schmitt triggers 18 and 20 are applied to a circuit designated as logic circuit 22. Thus, the Schmitt trigger circuits 18 and 20 apply their outputs and the complements of their outputs to the logic circuits.

Terminal $\bar{A}$ is connected to a delay circuit 24. The output of this delay circuit is connected to a third Schmitt trigger circuit 26. Both the output terminal C and its complement terminal $\bar{C}$ of Schmitt trigger circuit 26 are connected to the logic circuit 22. The output terminal B of Schmitt trigger circuit 20 is connected to a delay circuit 28. The output of the delay circuit drives a fourth Schmitt trigger circuit 30. The respective output and complementary output terminals D, $\bar{D}$ are also coupled to the logic circuits 22. As will be shown below herein, the logic circuits 22 in response to the pattern of the pulses presented by the Schmitt trigger circuits, detect the direction of motion of the table 14. Pulses indicative of such motion direction and of the extent thereof are obtained on either a forward-motion output terminal 32 or on a reverse-motion output terminal 34.

Reference is made to FIGURE 2, which shows the waveforms obtained at the various Schmitt trigger circuit output terminals. The waveforms A, $\bar{A}$, and B, $\bar{B}$ are what may be termed "fixed in space," while the waveforms C, $\bar{C}$, and D, $\bar{D}$ are not fixed in space. Thus, waveform C lags A and waveform D lags B. As a result, waveforms C and D may occur, either in front of or behind the respective waveforms A and B, depending upon which direction the observer moves. The two cases are illustrated in the waveforms shown in FIGURE 2. The sampling time 1 occurs when the Schmitt trigger circuit 18 is energized; sampling time 2 occurs when the Schmitt trigger 20 (B, $\bar{B}$) is energized; sampling time 3 occurs when Schmitt trigger 26 (C, $\bar{C}$) is energized; and sampling time 4 occurs when Schmitt trigger 30 (D, $\bar{D}$) is energized. Sampling times 1, 2, 3, and 4 have the identical significance for the reverse direction of travel.

The logic circuits 22, shown in FIGURE 1, must be able to differentiate between the two cases of motion. Thus, while traveling in the forward direction, in order to detect the fact that a motion in the forward direction is occurring at position designated as 1R, the logic circuits would provide an output in response to the simultaneous, unique occurrence of positive-going outputs at $\bar{A}$, C, B, and D. This combination of conditions occurs only as point 1 is passed while moving in the forward direction. The set of conditions will exist in time only for the duration of the delay, since at the end of the delay time C will fall to its lower level.

To recognize point 1 while traveling in the reverse direction, the logic circuits would need to be checked when the following waveforms were simultaneously positive-going: A, $\bar{C}$, B, and D. This combination of conditions occurs only as point 1 is passed while moving in the reverse direction. The table provided below shows the combination of conditions required to recognize any one of the four points for both directions of motion.

| Point | Forward | Reverse |
| --- | --- | --- |
| 1 | $\bar{A}$ B C D | A B $\bar{C}$ D |
| 2 | $\bar{A}$ B $\bar{C}$ D | A B $\bar{C}$ $\bar{D}$ |
| 3 | A B $\bar{C}$ $\bar{D}$ | A $\bar{B}$ C $\bar{D}$ |
| 4 | A B C $\bar{D}$ | A B C D |

FIGURE 3 shows a circuit for recognizing the four points while going in the forward direction. It provides four output pulses when there is forward motion. This circuit provides the following logical condition:

$$F = \bar{A}BCD + \bar{A}B\bar{C}D + AB\bar{C}\bar{D} + ABC\bar{D} \qquad (1)$$

In FIGURE 3, the input terminals are given the same reference letters as the output terminals of the Schmitt trigger circuits represented in FIGURE 1. It should be noted that FIGURES 3 and 4 comprise the logic circuits 22 in FIGURE 1.

Referring now to FIGURE 3, terminals $\bar{A}$ and D are connected to an AND gate which includes two diodes 40 and 42, respectively connected from terminals $\bar{A}$ and D to a junction 44, which is connected through a resistor 46 to a source of positive potential. In the quiescent condition, either one or both of the diodes 40, 42 is conductive. As a result, current flows through the resistor 46 and the potential of terminal point 44 is low. When, as a result of wave shapes $\bar{A}$ and D being simultaneously positive-going, diodes 40 and 42 are cut off or made to be nonconductive, junction 44 rises up in potential to the lowest potential existing at the cathodes of diodes 40, 42. As a result, a diode 48, which has its anode connected to terminal 44 and its cathode connected through a junction 49 to a resistor 52, is enabled to conduct.

In the quiescent condition, when either of the diodes 40, 42, or both, are conductive, diode 48 is conductive and junction 49 to which it is connected is thereby clamped to the potential of junction 44.

Diodes 60 and 62 are connected respectively between terminals A and $\bar{D}$ and a junction 64. A resistor 66 is also connected between its source of positive potential and the junction 64. Another diode 68 is connected between the junction 64 and diode 56. The operation of diodes 60, 62 and 68, in response to positive A and $\bar{D}$ pulses, is the same as the operation of diodes 40 and 42 in response to $\bar{A}$ and D pulses, which are positive. Thus, diodes 40, 42 and 60, 62 are connected to provide AND gate operation and diodes 44 and 68 are connected to provide OR gate operation.

Terminals B and C are connected to an AND gate 70. Terminals $\bar{B}$ and $\bar{C}$ are connected to an AND gate 72. The circuitry of the AND gates 70 and 72 are identical to the circuitry actually shown, including the diodes 40, 42, and 48, for example. Therefore, these will not be redescribed here.

The outputs of these AND gates are applied to an OR gate 73 which has structure identical with that described for diodes 48 and 68. Thus, in the simultaneous presence of inputs B and C, AND gate 70 applies an output to OR gate 73. In the simultaneous presence of inputs $\bar{B}$ and $\bar{C}$, AND gate 72 applies an output to OR gate 73. OR gate 73 provides an output in response to either of its inputs. Both the output of OR gate 73 and of the OR gate including diodes 48 and 68 are connected to an AND gate comprised of two diodes 56, 58, respectively having their cathodes connected to junction 49 and to OR gate 73. A resistor 54 applies a source of positive potential to the anodes of diodes 56, 58 and to the output terminal 32. In operation when diodes 56, 58 have outputs from the two OR gates simultaneously applied to their inputs the potential on terminal 32 will rise up to some positive value determined by the positive potential source if both diodes are cut off, or if not cut off by the lowest potential applied to the cathodes of diodes 56, 58. From the above, it will be seen that an output pulse will be obtained at terminal 32, indicative of motion in the forward direction when any one of the four conditions set forth in Equation 1 are sensed by the logic circuits of FIGURE 3. Thus, four output pulses are obtained for each cycle in passing through points 1, 2, 3, and 4 in the forward direction.

FIGURE 4 is a block diagram of the circuitry required for recognizing the conditions shown in the equation:

$$R = AB\overline{C}D + \overline{A}B\overline{C}\overline{D} + \overline{A}BC\overline{D} + A\overline{B}CD \quad (2)$$

FIGURE 4 will be recognized as being identical with FIGURE 3, except that the required inputs to the respective AND gates 80, 82, 84, and 86 are those shown in the second logical equation. Thus, AND gate 80 will provide an output only when there is simultaneously applied to its input positive-going potentials at the output terminals A and D. Positive-going potentials at terminals $\overline{A}$ and $\overline{D}$ will enable AND gate 82 to provide a positive-output pulse. The outputs of these AND gates is applied to an OR gate 81, the output of which is applied to one input of an AND gate 88, the output of which is connected to the "reverse" output terminal 34. An OR gate 87 responds to output from either AND gate 84 or AND gate 86 and applies its output to the other input of AND gate 88. Four pulses per cycle are obtained whenever there is motion in the reverse direction at the terminal 34.

The circuits shown in FIGURES 3 and 4 actually implement the following logical equations:

$$F = (\overline{A}D + A\overline{D})(BC + \overline{B}\overline{C}) \quad (3)$$

$$R = (AD + \overline{A}\overline{D})(B\overline{C} + \overline{B}C) \quad (4)$$

These equations are logically equivalent to Equations 1 and 2 and are derived from them. If the logic is implemented from these equations, then the components may be saved. If fewer than four pulses are desired per cycle, at either the forward or reverse output terminal, then the logical equations may be rewritten to call for pulses at whichever of the four points pulses are desired. Thus, FIGURE 5 is a circuit diagram of an arrangement for producing only one pulse per cycle. The logical equations are as follows:

$$F = A\overline{B}\overline{C} \quad (5)$$

$$R = A\overline{B}C \quad (6)$$

In FIGURE 5, the two outputs, respectively A and B, from the motion transducer are applied to two Schmitt trigger circuits, 90, 92, as before. The output terminals from Schmitt trigger circuit 90 are again designated as $\overline{A}$ and A, having the same signifiance as previously indicated. The output terminals from Schmitt trigger circuit 92 are also designated by $\overline{B}$ and B. Output terminals $\overline{A}$ and A are connected to two delay lines, respectively 94, 96. The outputs from these two delay lines are respectively designated as the C and $\overline{C}$ outputs. Thus, when the $\overline{A}$ output is positive, then an output will be derived on the $\overline{C}$ terminal at some suitable later interval determined by the delay-line constants. This interval may be the same as the one established for delay line 24 in FIGURE 1. Similarly, when the A terminal of Schmitt trigger 90 is positive, then delay line 96 will subsequently provide an output at the C terminal. The interval of such output occurring after the A terminal is rendered positive is the same as that established for delay line 24 in FIGURE 1.

Three transistors, respectively 101, 102, 103, have their collectors all connected to a load resistor 104, the other end of which is connected to a source of negative operating potential and also to an output terminal 105. In the quiescent state these transistors conduct current causing the potential at terminal 105 to be zero. When by virtue of input signals which are provided from the A, $\overline{B}$ or $\overline{C}$ terminals any one or two of the transistors are driven into cut off, the potential at the output terminal 105 will still be zero due to the continuing current in the third transistor. However, when all three transistors are driven into cut off, the output terminal will go from zero potential to a negative potential. Thus, effectively, the three transistors 101, 102, and 103 operate as an AND gate and provide an output only in response to the inputs respectively designated by the A, $\overline{B}$, and $\overline{C}$ letters.

For detecting reverse motion, three other transistors are employed, respectively 111, 112, and 113. These three transistors also have the same circuit configuration as transistors 101, 102, 103. However, their bases are respectively connected to the $\overline{A}$, $\overline{B}$, and C terminals. The three transistors 111, 112, and 113 have their collectors connected to derive operating potential through a resistor 114 and are also connected to an output terminal 115. The terminal 115 will not provide a negative potential output unless all three transistors are driven from their saturation conduction condition to their cut off condition by positive signals received from the designated input terminals.

The circuitry shown in FIGURE 5 provides a single pulse for each cycle produced by the motion transducer when there is forward motion. It also provides a single pulse on the reverse output terminal for each cycle provided by the motion transducer in reverse motion. Equations 5 and 6 recognize motion as it occurs at point 3. Waveform D need not be detected, since it never changes at point 3. The reason for omitting the additional Schmitt circuits following the delay lines with the configuration shown in FIGURE 5 is that the output of the delay line is sufficient for energizing promptly the transistor AND gate that follows without the additional squaring which the Schmitt trigger circuit provided in FIGURE 1.

There has accordingly been shown and described herein a novel, useful, and simple circuit for detecting the direction of motion from the output of a motion transducer. Although the wave shapes represented in FIGURE 2 are described as being derived from input signal trains by using Schmitt trigger circuits and delay lines, this is to be construed as exemplary, and not a limitation on the invention, since those skilled in the art will recognize that other circuits, such as a limiter and phase inverter, can be used to achieve the same results, although these are not the preferred circuits.

I claim:

1. A circuit for producing an output indicative of the direction of motion of an object from signals produced by a motion transducer actuated thereby, said motion transducer producing a first and a second train of relatively phase-displaced signals upon the occurrence of motion, said circuit comprising a first, second, third and fourth circuit each having an input terminal and a first and second output terminal and each being of the type that provides an output signal at its first output terminal except when a signal exceeding a predetermined level is applied to its input terminal whereupon an output signal is provided at its second output terminal, means for respectively applying said first and second trains of relatively phase-displaced signals to the first and second circuit input terminals, a first delay circuit, means coupling said first circuit first output terminal to said first delay circuit input, means coupling said third circuit input to said first delay circuit output, a second delay circuit, means coupling said second circuit second output terminal to the input of said second delay circuit, means coupling said fourth circuit input terminal to said second delay circuit output, first logic means for providing an output indicative of forward motion of said object responsive to a first predetermined pattern of outputs presented by the output terminals of said first, second, third and fourth circuits, and second logic means for providing an output indicative of reverse motion of said object responsive to a second predetermined pattern of outputs presented by the output terminals of said first, second, third and fourth circuits.

2. A circuit as recited in claim 1 wherein said first logic means includes a first, second, third, fourth and fifth AND gate, each AND gate having two inputs and an output, means respectively coupling said first AND gate two inputs to the first circuit first output terminal and the fourth circuit second output terminal, means respectively coupling the second AND gate two inputs to the first circuit second output terminal and the fourth circuit first output terminal, means respectively coupling said third AND gate two inputs to the respective second output terminals of the second and third circuits, means respectively coupling said fourth AND gate two inputs to the respective first output terminals of said second and third circuits, a first OR gate, means connecting the first and second AND gate outputs to the first OR gate input, a second OR gate, means coupling the third and fourth AND gate outputs to the second OR gate input, and means respectively coupling the first and second OR gate outputs to the respective inputs of said fifth AND gate.

3. A circuit as recited in claim 1 wherein said second logic means includes a first, second, third, fourth and fifth AND gate, each AND gate having two inputs and an output, means respectively coupling said first AND gate two inputs to the respective second output terminals of the first and fourth circuits, means respectively coupling said second AND gate two inputs to the first outputs of the first and fourth circuits, means respectively coupling the second output terminal of the second circuit and the first output terminal of the third circuit to the two inputs of said third AND gate, means respectively coupling the two inputs of the fourth AND gate to the first output terminal of the second circuit and the second output terminal of the third circuit, a first and second OR gate, means coupling said first and second AND gate outputs to said first OR gate input, means coupling said third and fourth AND gate outputs to said second OR gate input, and means respectively coupling the first and second OR gate outputs to the respective inputs of said fifth AND gate.

4. A circuit for producing an output indicative of the direction of motion of an object from signals produced by a motion transducer actuated thereby, said motion transducer producing a first and a second train of relatively phase-displaced signals upon the occurrence of motion, said circuit comprising a first and second trigger circuit each having an input terminal and a first and second output terminal, and each being of the type that provides an output signal at its first output terminal except when a signal exceeding a predetermined level is applied to its input terminal whereupon an output signal is provided at its second output terminal, means for respectively applying said first and second trains of relatively phase-displaced signals to the first and second trigger circuit input terminals, a first delay line, means coupling said first delay line input to said first trigger circuit first output terminal, a second delay line, means coupling said second delay line input to said first trigger circuit second output terminal, first AND gate means having inputs connected to said first trigger circuit first output terminal, to said second trigger circuit second output terminal and to said second delay line output, to provide an output indicative of forward motion of said body in the simultaneous presence of all its inputs, and second AND gate means having inputs connected to said first trigger circuit first output terminal, said second trigger circuit second output terminal and to said first delay line output, to provide an output indicative of reverse motion of said body in the simultaneous presence of its inputs.

5. A circuit for producing an output indicative of the direction of motion of an object from signals produced by a motion transducer actuated thereby, said motion transducer producing a first and a second train of relatively phase-displaced signals upon the occurrence of motion, said circuit comprising a first and second trigger circuit each having an input terminal and a first and second output terminal and each being of the type that provides an output signal at its first output terminal except when a signal exceeding a predetermined level is applied to its input terminal whereupon an output signal is provided at its second output terminal, means for respectively applying said first and second trains of relatively phase-displaced signals to the first and second trigger circuit input terminals, a first delay line, means coupling said first delay line input to said first trigger circuit first output terminal, a first logic circuit responsive to a first output pattern being present on predetermined ones of said first and second trigger circuit terminals and said delay line output for generating an output indicative of forward motion of said body, and a second logic circuit responsive to a second output pattern being present on predetermined ones of said first and second trigger circuit terminals and said delay line output for generating an output indicative of reverse motion of said body.

References Cited in the file of this patent
UNITED STATES PATENTS

| | | |
|---|---|---|
| 2,685,082 | Beman et al. | July 27, 1954 |
| 2,779,539 | Darlington | Jan. 29, 1957 |